(12) United States Patent
Mori et al.

(10) Patent No.: US 9,811,876 B2
(45) Date of Patent: Nov. 7, 2017

(54) DISPLAY APPARATUS AND CONTROL METHOD

(71) Applicant: CANON KABUSHIKI KAISHA, Tokyo (JP)

(72) Inventors: Makiko Mori, Yokohama (JP); Kensuke Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/245,384

(22) Filed: Aug. 24, 2016

(65) Prior Publication Data
US 2017/0061575 A1    Mar. 2, 2017

(30) Foreign Application Priority Data

Aug. 31, 2015 (JP) .................................. 2015-170655

(51) Int. Cl.
*G06T 3/00* (2006.01)
*G03B 21/14* (2006.01)

(52) U.S. Cl.
CPC ............ *G06T 3/005* (2013.01); *G03B 21/147* (2013.01)

(58) Field of Classification Search
None
See application file for complete search history.

(56) References Cited

U.S. PATENT DOCUMENTS

| 7,204,595 | B2 | 4/2007 | Tamura |
| 7,227,521 | B2 | 6/2007 | Yamazaki et al. |
| 7,307,606 | B1 | 12/2007 | Yamazaki et al. |
| 7,889,168 | B2 | 2/2011 | Yamazaki et al. |
| 8,174,542 | B2 | 5/2012 | Mori |
| 2005/0078282 | A1* | 4/2005 | Tamura ................ H04N 9/3185 353/70 |
| 2014/0104582 | A1* | 4/2014 | Mori .................... H04N 9/3185 353/30 |
| 2014/0285778 | A1* | 9/2014 | Inoue .................. H04N 9/3185 353/70 |

FOREIGN PATENT DOCUMENTS

| JP | 2005-123669 A | | 5/2005 |
| JP | 2005-123693 A | | 5/2005 |
| JP | 2011155412 A | * | 8/2011 |
| JP | 2013-085159 A | | 5/2013 |

* cited by examiner

*Primary Examiner* — Delomia L Gilliard
(74) *Attorney, Agent, or Firm* — Fitzpatrick, Cella, Harper & Scinto

(57) ABSTRACT

A display apparatus includes a deforming unit configured to geometrically deform an input image in order to correct a distortion in a projected image obtained when the input image is projected on a projection surface; and a setting unit configured to set parameters of image deformation processing by the deforming unit, wherein the setting unit sets the parameters such that a position of an intersection of diagonal lines of a first projected image obtained when the image before being deformed according to the set parameters is projected on the projection surface is identical to a position of an intersection of diagonal lines of a second projected image obtained when a deformed image, which is an image after being deformed according to the set parameters, is projected on the projection surface.

11 Claims, 10 Drawing Sheets

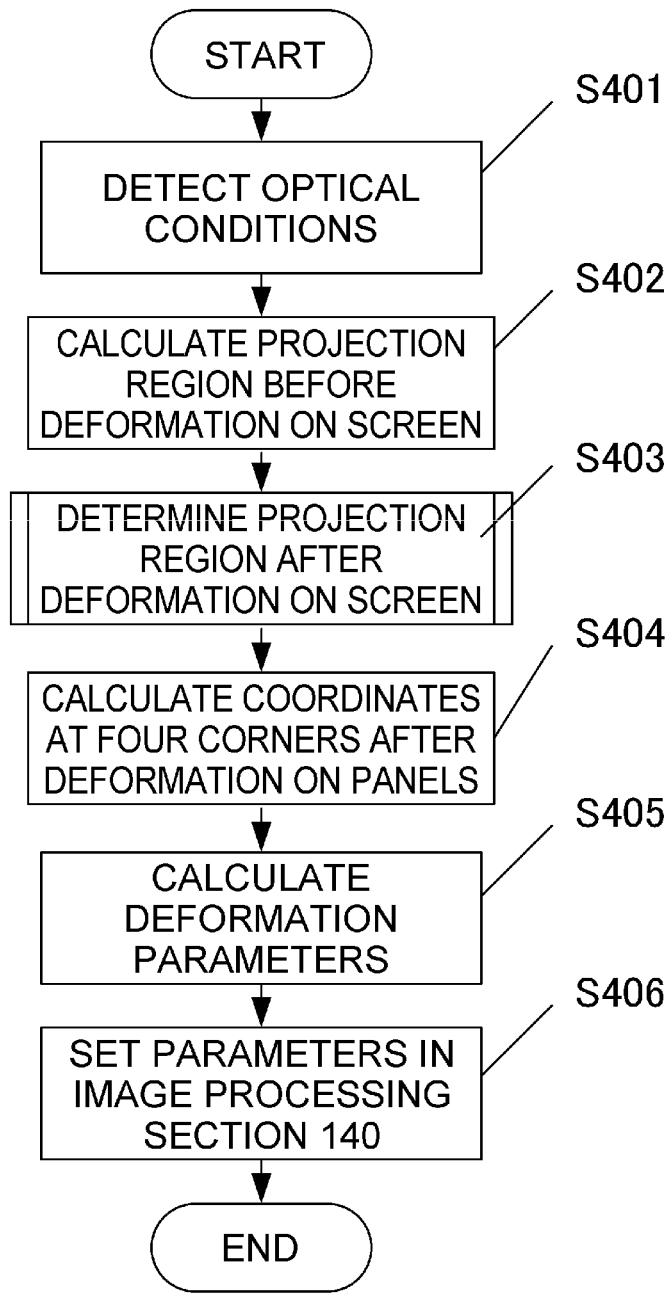

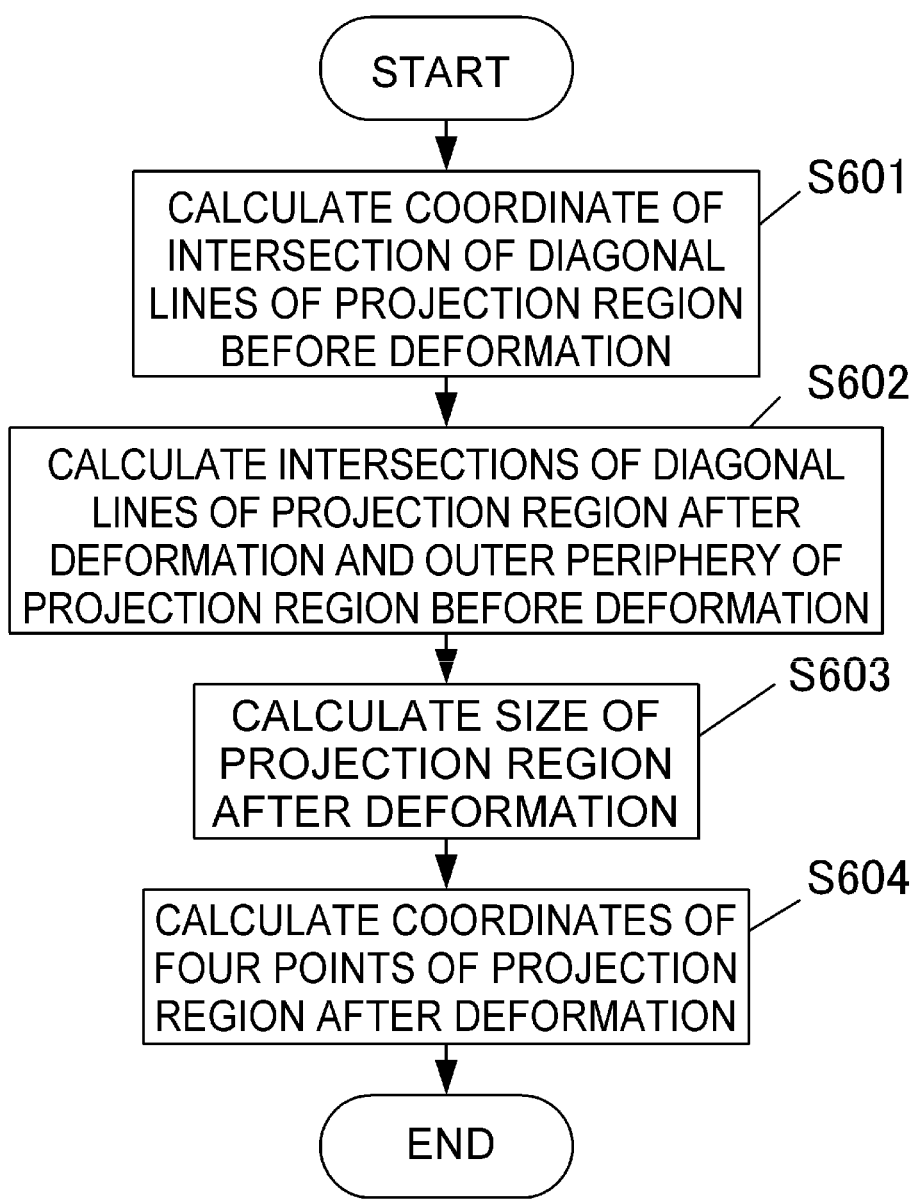

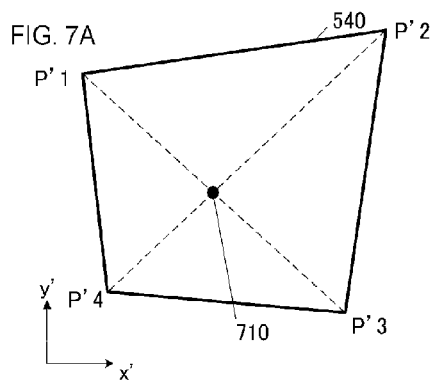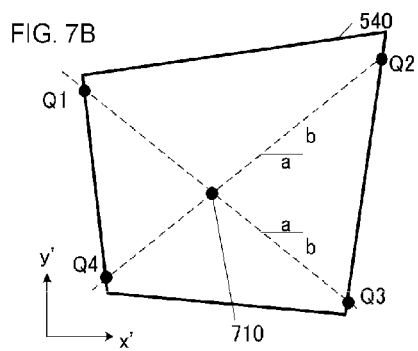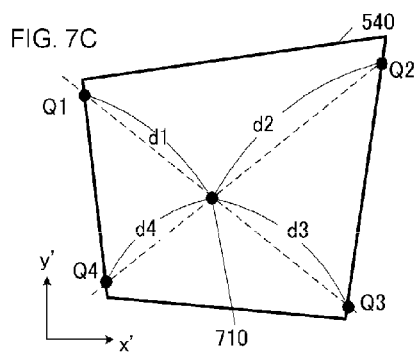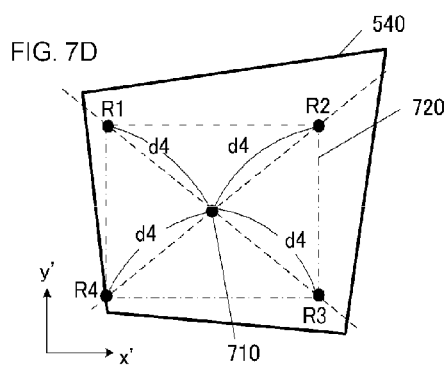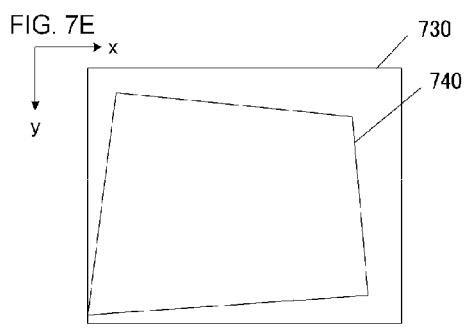

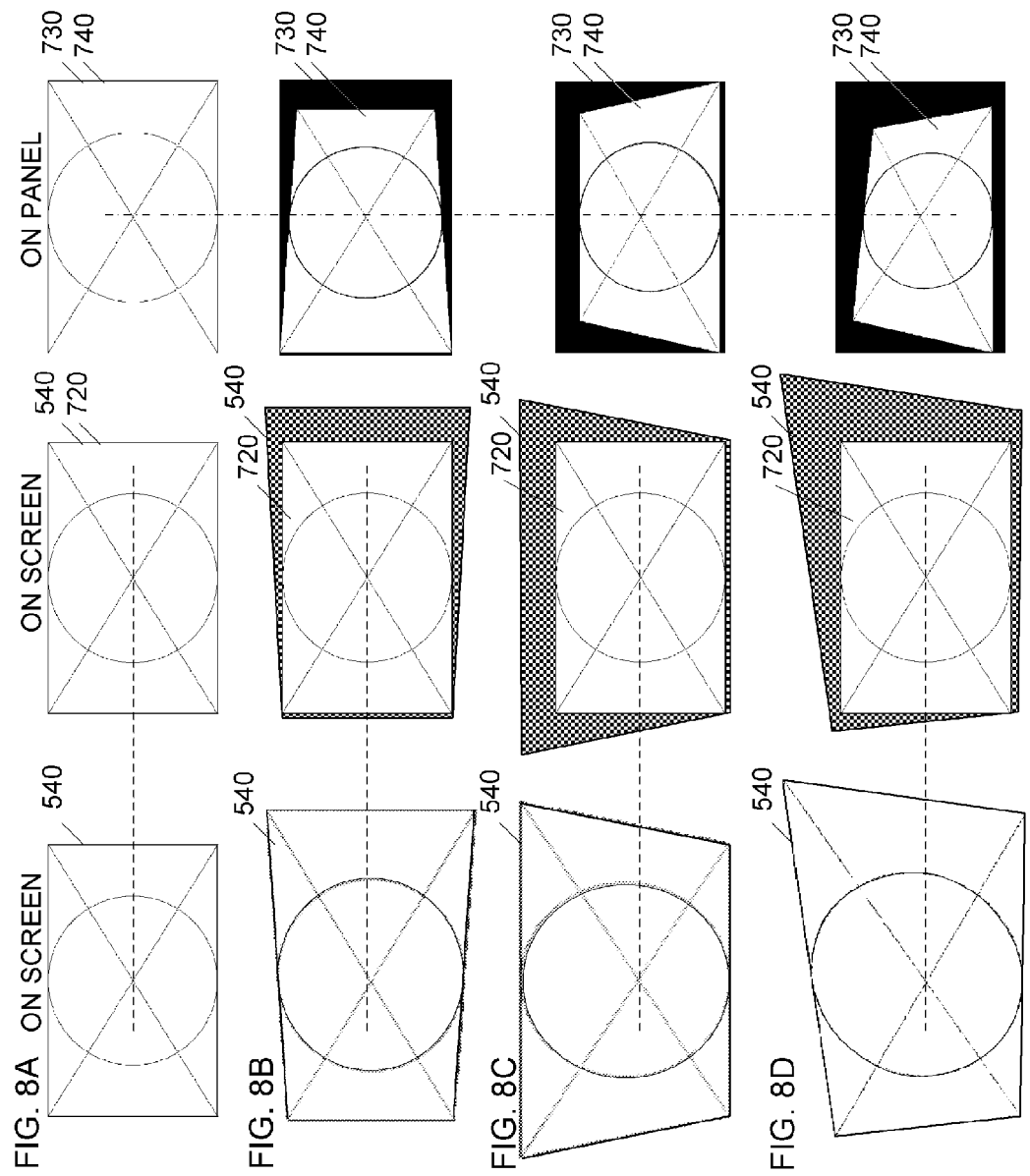

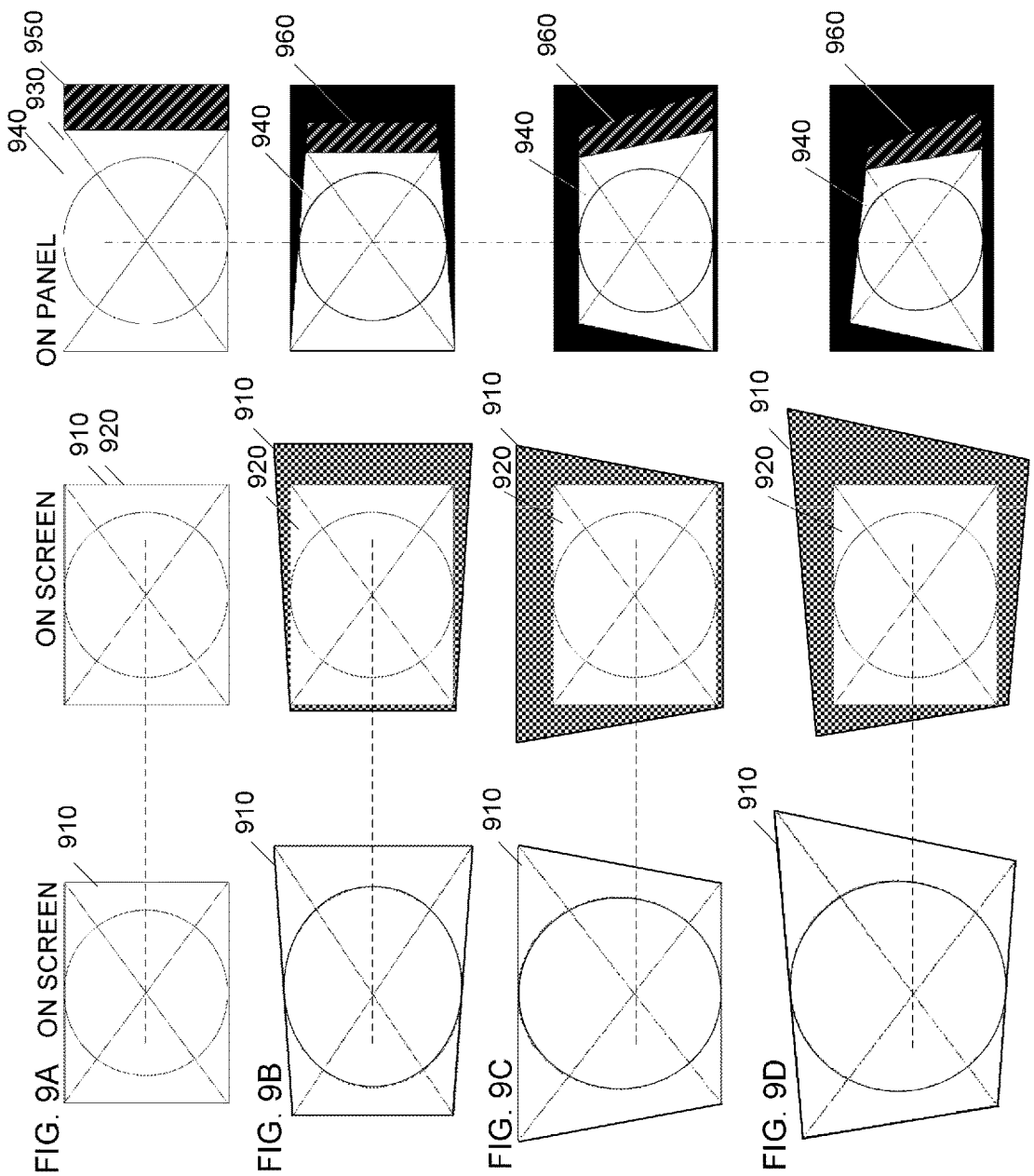

DISPLAY APPARATUS AND CONTROL METHOD

BACKGROUND OF THE INVENTION

Field of the Invention

The present invention relates to a display apparatus and a control method therefor.

Description of the Related Art

In a projector, a geometric distortion called trapezoidal distortion occurs on a screen because of relative tilts of the projector and the screen. In order to solve the trapezoidal distortion, many projectors have a trapezoidal correction function (a keystone correction function) for correcting the trapezoidal distortion through image processing.

Japanese Patent Application Laid-Open No. 2005-123669 describes a method of performing reduction deformation when aspect ratios of a liquid crystal panel and an input image are the same. Japanese Patent Application Laid-Open No. 2005-123693 describes a method of generating as large a correction image as possible in a projection region in order to reduce deterioration in image quality involved in reduction of a correction image. Japanese Patent Application Laid-Open No. 2013-85159 proposes a method of disposing an image after deformation in the center of a screen.

SUMMARY OF THE INVENTION

However, in the methods described in Japanese Patent Application Laid-Open No. 2005-123669 and Japanese Patent Application Laid-Open No. 2005-123693, a position where an image after deformation is displayed moves according to, for example, directions of relative inclination angles of a projector and a screen.

Therefore, it is difficult for a user to learn, before the deformation, the position where the image after deformation is displayed. The image after deformation sometimes cannot be displayed in a position expected by the user. In such a case, it is necessary to move an installation position of the projector and adjust a display position using a lens shift mechanism or the like. As a result, a burden of readjustment of the display position increases.

Further, when the projector and the screen relatively incline, the distance between the projector and the screen is different within a region of the screen. In this case, a projected image is more enlarged in a region of the screen farther from the projector. Therefore, in the method described in Japanese Patent Application Laid-Open No. 2013-85159, although a movement amount of a position where an image after deformation is displayed is small, a distortion of an upper part or a lower part of the image after deformation is sometimes large. In such a case, it is necessary to move an installation position of the projector and adjusting a display position using the lens shift function or the like. As a result, a burden of readjustment of the display position increases.

Therefore, an object of the present invention is to reduce a burden of readjustment of a display position and improve convenience in installation of a display apparatus.

The present invention uses the following configuration. In other words, the present invention is a display apparatus including a projection optical system that projects an image on a projection surface, the display apparatus comprising: a deforming unit configured to geometrically deform an input image in order to correct a distortion in a projected image obtained when the input image is projected on the projection surface; and a setting unit configured to set parameters of image deformation processing by the deforming unit, wherein the setting unit sets the parameters such that a position of an intersection of diagonal lines of a first projected image obtained when the image before being deformed according to the set parameters is projected on the projection surface is identical to a position of an intersection of diagonal lines of a second projected image obtained when a deformed image, which is an image after being deformed according to the set parameters, is projected on the projection surface.

The present invention also uses the following configuration. In other words, the present invention is a control method for a display apparatus including a projection optical system that projects an image on a projection surface, the control method comprising: geometrically deforming an input image in order to correct a distortion in a projected image obtained when the input image is projected on the projection surface; and setting parameters of image deformation processing in the deforming, wherein in the setting, the parameters are set such that a position of an intersection of diagonal lines of a first projected image obtained when the image before being deformed according to the set parameters is projected on the projection surface is identical to a position of an intersection of diagonal lines of a second projected image obtained when a deformed image, which is an image after being deformed according to the set parameters, is projected on the projection surface.

According to the present invention, it is possible to reduce a burden of readjustment of a display position and improve convenience in installation of a display apparatus.

Further features of the present invention will become apparent from the following description of exemplary embodiments with reference to the attached drawings.

BRIEF DESCRIPTION OF THE DRAWINGS

FIG. 4 is a flowchart of processing executed by a CPU 110 in the first embodiment;

FIG. 6 is a flowchart for explaining calculation processing for a projection region after deformation on the screen;

FIGS. 7A to 7E are diagrams for explaining a determination method for the projection region after deformation on the screen;

FIGS. 8A to 8D are diagrams showing an example of an image formed when keystone correction is carried out;

FIGS. 9A to 9D are diagrams showing an example of an image formed when the keystone correction is carried out.

DESCRIPTION OF THE EMBODIMENTS

Embodiments of the present invention are explained below with reference to the drawings. However, the present invention is not limited to the embodiments explained below.

First Embodiment

Figure 1:
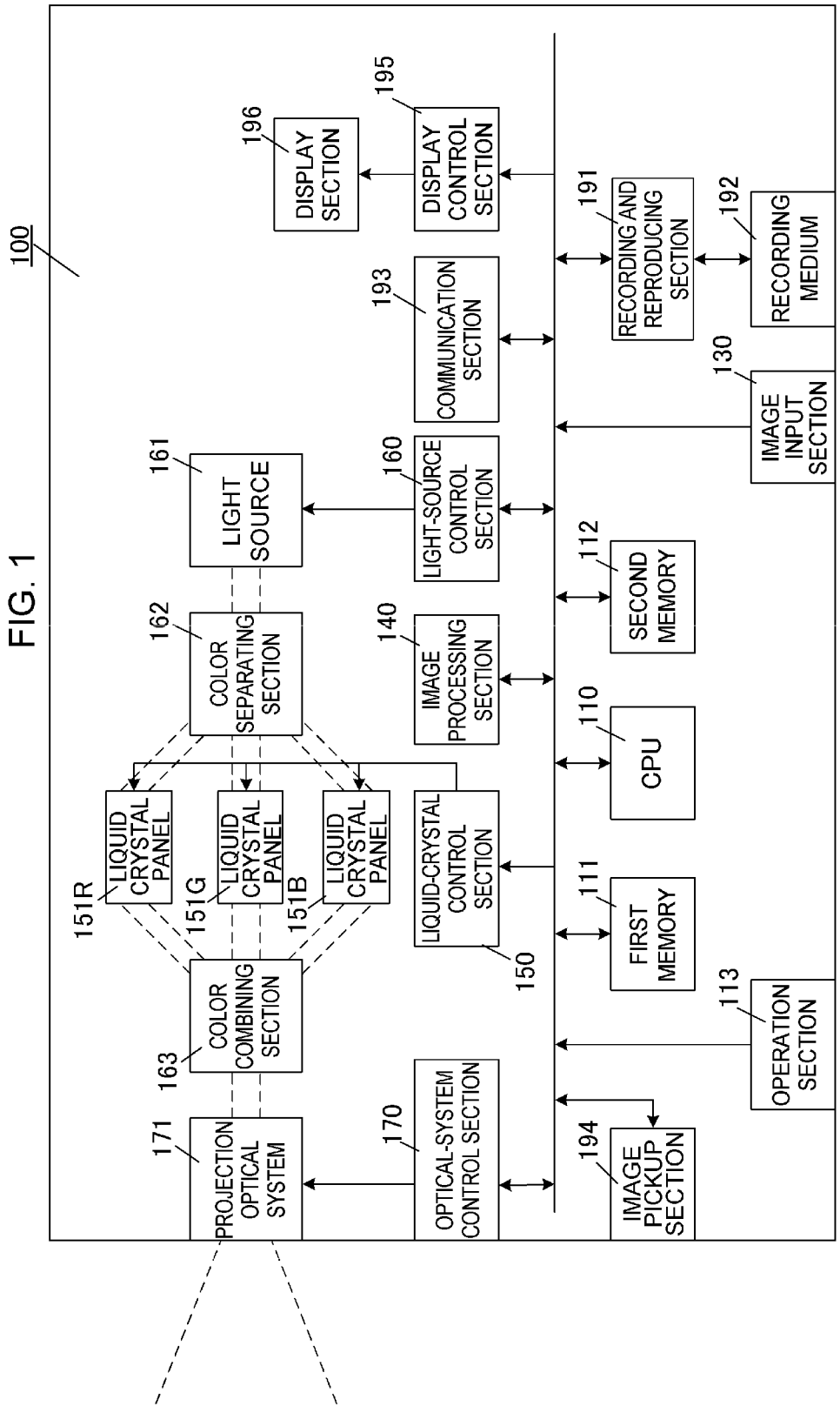
FIG. 1 is a block diagram for explaining a plurality of components included in a display apparatus 100 in a first embodiment.

FIG. 1 is a block diagram for explaining a plurality of components included in a display apparatus 100 in a first embodiment.

In the first embodiment, the display apparatus 100 operates as, for example, a projector. However, the display apparatus 100 is not limited to the projector. For example, when the display apparatus 100 operates as the projector, the display apparatus 100 can control light transmittance of a liquid crystal element according to an input image signal. Consequently, the display apparatus 100 can display, on a screen, an image (a still image or a moving image) generated from the input image signal. When the display apparatus 100 operates as the projector, the display apparatus 100 can be configured as a single-plate type projector and can be configured as a three-plate type projector. When the display apparatus 100 operates as the projector, the display apparatus 100 can be configured as a projector including a liquid crystal display and can be configured as a projector including an organic electroluminescence (EL) display. When the display apparatus 100 operates as the projector, the display apparatus 100 can also be configured as a projector including a microelectromechanical systems (MEMS) shutter.

In FIG. 1, the display apparatus 100 includes a central processing unit (CPU) 110, a first memory 111, a second memory 112, an operation section 113, an image input section 130, and an image processing section 140. The display apparatus 100 further includes a liquid-crystal control section 150, a liquid crystal panel 151R, a liquid crystal panel 151G, a liquid crystal panel 151B, a light-source control section 160, a light source 161, a color separating section 162, a color combining section 163, an optical-system control section 170, and a projection optical system 171. The display apparatus 100 further includes a recording and reproducing section 191, a recording medium 192 a communication section 193, an image pickup section 194, a display control section 195, and a display section 196. However, the recording medium 192 may be a recording medium detachable from the display apparatus 100.

The CPU 110 controls the components included in the display apparatus 100. The first memory 111 is a memory storing a plurality of programs to be executed by the CPU 110. The second memory 112 is a memory that functions as a work memory and stores programs and data. The CPU 110 can display, on the screen, image data (still image data and moving image data) read out from the recording medium 192 by the recording and reproducing section 191. The CPU 110 can also display, on the screen, image data (still image data and moving image data) receive by the communication section 193. The CPU 110 can also record, in the recording medium 192, image data (still image data or moving image data) generated by the image pickup section 194. The CPU 110 can also record, in the recording medium 192, image data (still image data or moving image data) received by the communication section 193.

The operation section 113 receives an instruction from a user and transmits an instruction signal to the CPU 110. The operation section 113 includes instruction inputting means such as a switch, a dial, or a touch panel provided on the display section 196. The operation section 113 may transmit, to the CPU 110, an instruction signal received by, for example, a signal receiving section (an infrared-ray receiving section, etc.) that receives an instruction signal from a remote controller. The CPU 110 controls the components included in the display apparatus 100 according to the instruction signal from the operation section 113 or the remote controller.

The image input section 130 receives an image signal from an external apparatus. The image input section 130 includes, for example, a composite terminal, an S terminal, a D terminal, a component terminal, an analog RGB terminal, a DVI-I terminal, a DVI-D terminal, and an HDMI (registered trademark) terminal. When receiving an analog image signal, the image input section 130 converts the received analog image signal into a digital image signal. The image input section 130 transmits the received image signal to the image processing section 140. The external apparatus may be any apparatus such as a personal computer, a camera, a cellular phone, a smartphone, a hard disk recorder, or a game machine as long as the apparatus can output an image signal.

The image processing section 140 can apply various kinds of image processing to the image signal received by the image input section 130 and transmit the image signal to the liquid-crystal control section 150. The image processing executable by the image processing section 140 includes frame thinning processing, frame interpolation processing, resolution conversion processing, OSD (on screen display) superimposition processing, image deformation processing (including keystone correction), and edge blending processing. The image processing section 140 can also apply the image processing to the image data transmitted from the recording and reproducing section 191 or the communication section 193 to the CPU 110.

The liquid-crystal control section 150 adjusts the transmittance of the liquid crystal panels 151R, 151G, and 151B on the basis of the image signal processed by the image processing section 140. The liquid-crystal control section 150 is configured by a microprocessor for control.

The liquid-crystal control section 150 does not need to be a dedicated microprocessor. For example, the CPU 110 may execute processing same as the processing of the liquid-crystal control section 150 according to a program stored in the first memory 111. For example, when an image signal is input to the image processing section 140, every time the liquid-crystal control section 150 receives an image of one frame from the image processing section 140, the liquid-crystal control section 150 controls the liquid crystal panels 151R, 151G, and 151B to have transmittance corresponding to the image.

The liquid crystal panel 151R is a liquid crystal panel corresponding to red. The liquid crystal panel 151R is a liquid crystal panel for adjusting the transmittance of red light among lights of red (R), green (G), and blue (B) separated by the color separating section 162 in light output from the light source 161. The liquid crystal panel 151G is a liquid crystal panel corresponding to green. The liquid crystal panel 151G is a liquid crystal panel for adjusting the transmittance of green light among the lights of red (R), green (G), and blue (B) separated by the color separating section 162 in the light output from the light source 161. The liquid crystal panel 151B is a liquid crystal panel corresponding to blue and is used for adjusting the transmittance of blue light among the lights of red (R), green (G), and blue (B) separated by the color separating section 162 in the light output from the light source 161. The operation control of the liquid crystal panels 151R, 151G, and 151B by the liquid-crystal control section 150 and the configuration of the liquid crystal panels 151R, 151G, and 151B are explained below.

The light-source control section 160 controls ON/OFF and a light amount of the light source 161. The light-source control section 160 is configured by a microprocessor for control. The light-source control section 160 does not need to be a dedicated microprocessor. For example, the CPU 110 may execute processing same as the processing of the light-source control section 160 according to a program stored in the first memory 111.

The light source 161 outputs light for projecting an image on the screen. The light source 161 may be, for example, a halogen lamp, a Xenon lamp, or a high-pressure mercury lamp. The color separating section 162 separates the light output from the light source 161 into lights of red (R), green (G), and blue (B). The color separating section 162 is configured from, for example, a dichroic mirror and a prism. When LEDs or the like corresponding to the colors are used as the light source 161, the color separating section 162 is unnecessary. The color combining section 163 combines the lights of red (R), green (G), and blue (B) transmitted through the liquid crystal panels 151R, 151G, and 151B. The color combining section 163 is configured from, for example, a dichroic mirror and a prism. Light obtained by combining components of red (R), green (G), and blue (B) with the color combining section 163 is sent to the projection optical system 171. At this point, the liquid crystal panels 151R, 151G, and 151B are controlled by the liquid-crystal control section 150 to have light transmittance corresponding to the image input from the image processing section 140. Therefore, when the light combined by the color combining section 163 is projected on the screen (a projection surface) by the projection optical system 171, an image corresponding to the image input by the image processing section 140 is displayed on the screen (the projection surface).

The optical-system control section 170 controls the projection optical system 171. The optical-system control section 170 is configured from a microprocessor for control. The optical-system control section 170 does not need to be a dedicated microprocessor. For example, the CPU 110 may execute processing same as the processing of the optical-system control section 170 according to a program stored in the first memory 111. The projection optical system 171 is a system for projecting the combined light output from the color combining section 163 on the screen. The projection optical system 171 includes a plurality of lenses and an actuator for lens driving. The projection optical system 171 can perform enlargement, reduction, focus adjustment, and the like of a projected image by driving the lenses with the actuator.

The recording and reproducing section 191 can reproduce image data (still image data or moving image data) from the recording medium 192 and transmit the image data to the CPU 110. The recording and reproducing section 191 can receive the image data (the still image data or the moving image data) generated by the image pickup section 194 from the CPU 110 and record the image data in the recording medium 192. The recording and reproducing section 191 may record the image data (the still image data or the moving image data) received from the communication section 193 in the recording medium 192. The recording and reproducing section 191 is configured from a microprocessor or a dedicated circuit for accessing the recording medium 192. The recording and reproducing section 191 does not need to include a dedicated microprocessor. For example, the CPU 110 may execute processing same as the processing of the recording and reproducing section 191 according to a program stored in the first memory 111.

The communication section 193 is a section for receiving a control signal, still image data, moving image data, and the like from an external communication apparatus. The communication section 193 may be, for example, a wireless LAN, a wired LAN, a USB, a Bluetooth (registered trademark), or the like. A communication system is not limited. If a terminal of the image input section 130 is, for example, an HDMI terminal, the communication section 193 may be a section for performing Consumer Electronics Control (CEC) communication via the terminal. The external communication apparatus may be any apparatus such as a computer, a camera, a cellular phone, a smartphone, a hard disk recorder, a game machine, a remote controller, or the like as long as the apparatus can perform communication with the display apparatus 100.

The image pickup section 194 picks up an image of the periphery of the display apparatus 100 and generates image data (still image data or moving image data). The image pickup section 194 can pick up an image (pick up an image in a screen direction) projected via the projection optical system 171. The image pickup section 194 can transmit the image data generated by the image pickup section 194 to the CPU 110. The image pickup section 194 includes a lens unit, an actuator, a microprocessor, an image pickup element, and an image-data generating section. The lens unit acquires an optical image of an object. The actuator is configured to drive the lens unit. The microprocessor can control the actuator. The image pickup element can convert the optical image acquired via the lens unit into an image signal. The image-data generating section can generate image data from the image signal output from the image pickup element. The image pickup section 194 is not limited to the image pickup in the screen direction. The image pickup section 194 may pick up an image on the user side in the opposite direction of the screen.

The display control section 195 performs control for causing the display section 196 included in the display apparatus 100 to display a control screen or a switch icon for controlling the display apparatus 100. The display control section 195 includes a microprocessor that performs display control. The display section 196 displays the control screen or the switch icon for controlling the display apparatus 100. The display section 196 may be, for example, a liquid crystal display, a CRT display, an organic EL display, or an LED display and may be any display section as long as the display section can display an image.

Note that the image processing section 140, the liquid-crystal control section 150, the light-source control section 160, the optical-system control section 170, the recording and reproducing section 191, and the display control section 195 may be configured by a single or a plurality of microprocessors that can perform processing same as the processing of these components. Alternatively, for example, the CPU 110 may execute processing same as the processing of these components according to a program stored in the first memory 111.

Processing performed in the display apparatus 100 is explained with reference to FIGS. 1 and 2.

Figure 2:
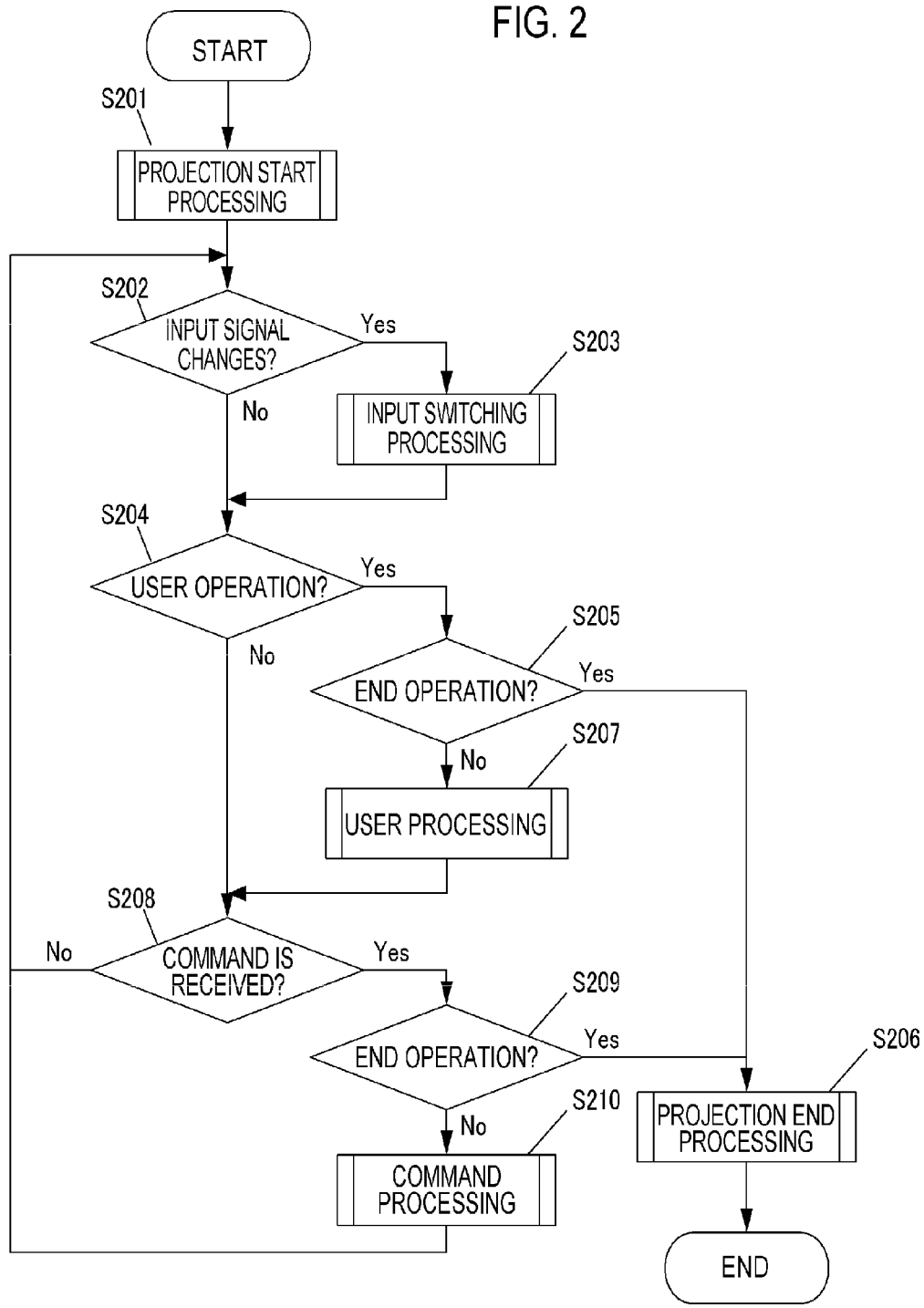
FIG. 2 is a flowchart for explaining processing performed in the display apparatus 100 in the first embodiment.

FIG. 2 is a flowchart for explaining the processing performed in the display apparatus 100 according to the first embodiment. The processing shown in FIG. 2 is executed by the CPU 110 controlling the components on the basis of a program stored in the first memory 111. The flowchart of FIG. 2 is started at a point in time when the user instructs power-on of the display apparatus 100 using the operation section 113 or the remote controller.

When the user instructs power-on of the display apparatus 100 using the operation section 113 or the remote controller, the CPU 110 supplies electric power to the components of the display apparatus 100 from a power supply section and executes projection start processing (S201). For example, the CPU 110 instructs the light-source control section 160 to perform lighting control of the light source 161. The CPU 110 instructs the liquid-crystal control section 150 to perform driving control of the liquid crystal panels 151R, 151G, and 151B. The CPU 110 performs operation setting and the like of the image processing section 140.

Subsequently, the CPU 110 determines whether an input signal from the image input section 130 has changed (S202). When the input signal has not changed, the CPU 110 proceeds to S204. When the input signal has changed, the CPU 110 executes input switching processing (S203). In S203, the CPU 110 detects, for example, resolution, a frame rate, and the like of the input signal, samples an input image at timing suitable for the resolution, the frame rate, and the like, and projects the input image after carrying out necessary image processing.

Subsequently, the CPU 110 determines whether an instruction from the user has been received (S204). When the instruction from the operation section 113 or the remote controller by the user has not been received, the CPU 110 proceeds to S208. When the instruction from the user has been received, the CPU 110 determines whether the instruction is an end instruction (S205). When the instruction from the user is the end instruction, the CPU 110 executes projection end processing (S206) and ends the projection. In S206, for example, the CPU 110 instructs the light-source control section 160 to perform extinction control of the light source 161, instructs the liquid-crystal control section 150 to perform driving stop control of the liquid crystal panels 151R, 151G, and 151B, and performs, for example, storage of necessary setting in the first memory 111.

When the instruction from the user is not the end instruction, the CPU 110 executes user processing corresponding to content of the instruction from the user (S207). In S207, the CPU 110 performs, for example, a change of installation setting, a change of an input signal, a change of image processing, and display of information.

Subsequently, the CPU 110 determines whether a command has been received from the communication section 193 (S208). When the command has not been received, the CPU 110 returns to S202. When the command has been received, the CPU 110 determines whether the command is an end instruction (S209). When determining affirmatively in S209, the CPU 110 proceeds to S206. When determining negatively in S209, the CPU 110 executes command processing corresponding to content of the received command (S210). Thereafter, the CPU 110 returns to S202. In S210, the CPU 110 performs, for example, installation setting, input signal setting, image processing setting, and state acquisition.

The display apparatus 100 is configured to be capable of displaying, on the screen, an image signal (a still image or a moving image) input from the image input section 130. The display apparatus 100 is also configured to be capable of displaying, on the screen, image data (still image data or moving image data) reproduced from the recording medium 192 by the recording and reproducing section 191. The display apparatus 100 is also configured to be capable of displaying, on the screen, image data (still image data or moving image data) received by the communication section 193.

Figure 3:
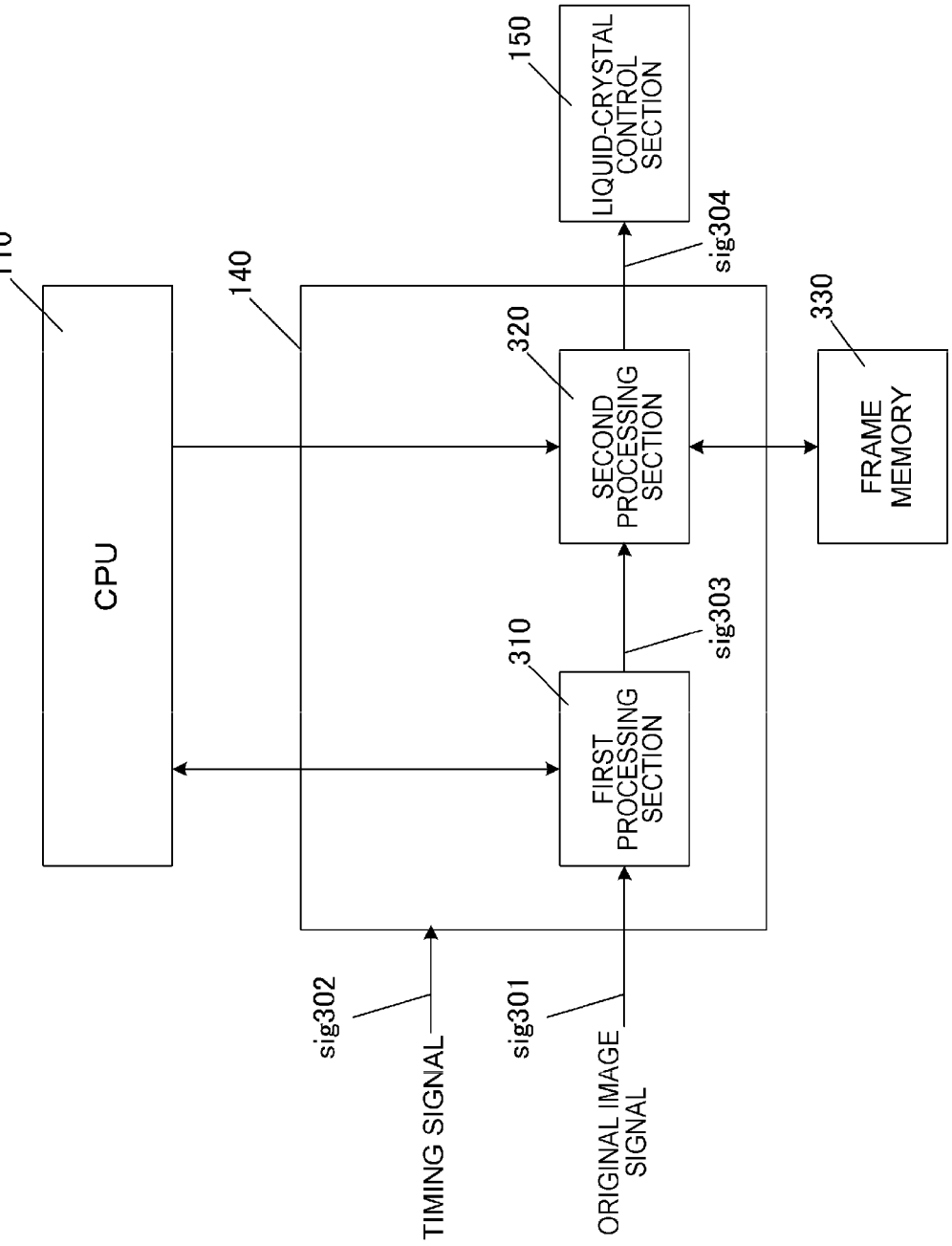
FIG. 3 is a block diagram for explaining a plurality of components included in an image processing section 140 shown in FIG. 1.

FIG. 3 is a block diagram for explaining a plurality of components included in the image processing section 140 shown in FIG. 1.

As shown in FIG. 3, the image processing section 140 includes a first processing section 310 and a second processing section 320. A frame memory 330 is a memory for storing an image before keystone correction (hereinafter, an image before deformation) or an image after the keystone correction (hereinafter, an image after deformation). The frame memory 330 is included in the second memory 112.

As explained above, an original image signal sig301 is input from the image input section 130, the recording and reproducing section 191, the communication section 193, or the like according to a display mode. A timing signal sig302 is a timing signal such as a vertical synchronization signal, a horizontal synchronization signal, or a clock for the original image signal sig301. The timing signal sig302 is supplied from a supply source of the original image signal sig301. The components in the image processing section 140 operate on the basis of the timing signal sig302. The image processing section 140 may recreate and use the timing signal on the inside.

The first processing section 310 applies various kinds of image processing to the original image signal sig301 to thereby generate a post-image processing signal sig303 from the original image signal sig301. The generated post-image processing signal sig303 is supplied from the first processing section 310 to the second processing section 320. The various kinds of image processing include acquisition of statistical information such as a histogram and an average picture level (APL) of an image signal. The various kinds of image processing include interlace/progressive (IP) conversion, frame rate conversion, resolution conversion, γ conversion, color gamut conversion, color correction, and edge enhancement. As these kinds of image processing, publicly-known methods only have to be used.

The second processing section 320 applies image deformation processing (including keystone correction) to the post-image processing signal sig303 to thereby generate an image signal after deformation sig304 from the post-image processing signal sig303. The generated image signal after deformation sig304 is supplied to the liquid-crystal control section 150. The keystone correction can be realized by projection transformation. When any coordinate of an original image is represented as (xs, ys), a coordinate (xd, yd) of an image after deformation corresponding to the image is represented by Expression 1.

[Math. 1]

$$\begin{bmatrix} xd \\ yd \\ 1 \end{bmatrix} = M \begin{bmatrix} xs - xso \\ ys - yso \\ 1 \end{bmatrix} + \begin{bmatrix} xdo \\ ydo \\ 0 \end{bmatrix} \qquad \text{Expression 1}$$

Figure 10:
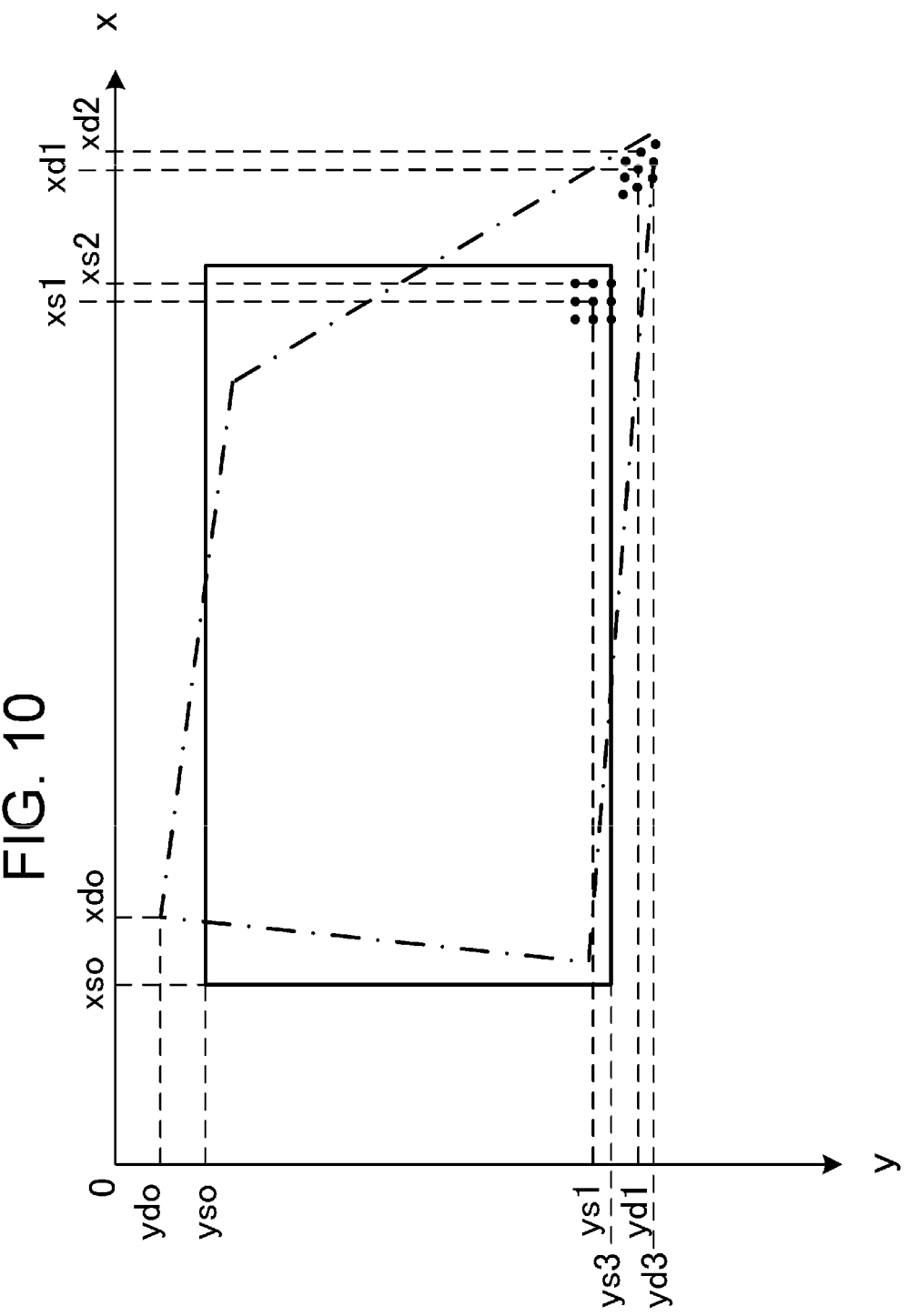
FIG. 10 is a diagram for explaining projection transformation.

In the expression, M represents a 3×3 matrix and is a projection transformation matrix for performing projection transformation from an original image input from the CPU 110 into an image after deformation. A figure for explaining the projection transformation is shown in FIG. 10. In the expression, xso, yso is a coordinate of one vertex of the original image indicated by a solid line in FIG. 10 and xdo, ydo is a coordinate value of a vertex corresponding to the vertex (xso, yso) of the original image in the image after deformation indicated by an alternate long and short dash line in FIG. 10.

An inverse matrix $M^{-1}$ of the matrix M of Expression 1 and an offset (xso, yso), (xdo, ydo) are input to the second processing section 320 from the CPU 110. The second processing section 320 calculates a coordinate (xs, ys) of the original image corresponding to the coordinate value (xd, yd) of the image after deformation according to Expression 2.

[Math. 2]

$$\begin{bmatrix} xs \\ ys \\ 1 \end{bmatrix} = M^{-1} \begin{bmatrix} xd - xdo \\ yd - ydo \\ 1 \end{bmatrix} + \begin{bmatrix} xso \\ yso \\ 0 \end{bmatrix} \quad \text{Expression 2}$$

If the coordinate of the original image calculated on the basis of Expression 2 is an integer, a pixel value of the coordinate (xs, ys) of the original image may be directly calculated as a pixel value of the coordinate (xd, yd) of the image after deformation. However, the coordinate of the original image calculated on the basis of Expression 2 is not always an integer. Therefore, the coordinate of the original image is interpolated using a value of a peripheral pixel to calculate the pixel value of the coordinate (xd, yd) of the image after deformation. As a method of the interpolation, bilinear, bicubic, or any other interpolation method may be used. When the coordinate of the original image calculated on the basis of Expression 2 is outside a range of an original image region, the pixel value is black or a background color set by the user.

In this way, pixel values are calculated for all of coordinates after deformation to create an image after deformation.

In the above explanation, the inverse matrix $M^{-1}$ of the matrix M is input to the image processing section 140 from the CPU 110. However, it is also possible that only the matrix M is input to the image processing section 140 and the image processing section 140 calculates the inverse matrix $M^{-1}$ on the inside.

As explained above, the image signal after deformation sig304 output by the second processing section 320 is supplied to the liquid-crystal control section 150. An image based on the image signal after deformation sig304 is displayed on each of the liquid crystal panels 151R, 151G, and 151B.

A method of performing keystone correction of an image without changing the center position of the image is explained with reference to FIGS. 4 to 8.

FIG. 4 is a flowchart of processing executed by the CPU 110. The processing shown in FIG. 4 is started when the user changes setting of the keystone correction using the operation section 113 or the remote controller, when the user selects automatic correction, or when the user changes the position of a zoom lens or a shift lens included in the projection optical system 171.

First, the CPU 110 detects optical conditions (S401). The optical conditions are an inclination angle of the display apparatus 100, a zoom value of the zoom lens, a lens shift amount, and the like. The optical conditions desirably include at least one of the inclination angle, the zoom value, the lens shift amount, and the like. As the inclination angle, an output of an inclination sensor mounted on the display apparatus 100 may be detected or a relative angle of the display apparatus 100 and the screen may be calculated by measuring distances to the screen at a plurality of points. A keystone correction value set by the user using the remote controller or a menu may be used. The state and the lens shift amount of the zoom lens may be detected by an encoder included in the optical-system control section 170. Values set by the user using the remote controller or the menu may be used as the state and the lens shift amount. Note that, in the first embodiment, the optical conditions are detected in S401. However, the present invention is not limited to this. In S401, information concerning a positional relation between the display apparatus 100 (in particular, the projection optical system 171) and the projection surface of the screen only has to be acquired.

Subsequently, the CPU 110 calculates a projection region before deformation 540 on a screen 520 (S402). The projection region before deformation 540 is a region on the screen 520 where a projected image is located when an original image is projected on the screen 520. Processing details of this step are explained with reference to FIGS. 5A and 5B.

Figure 5A:
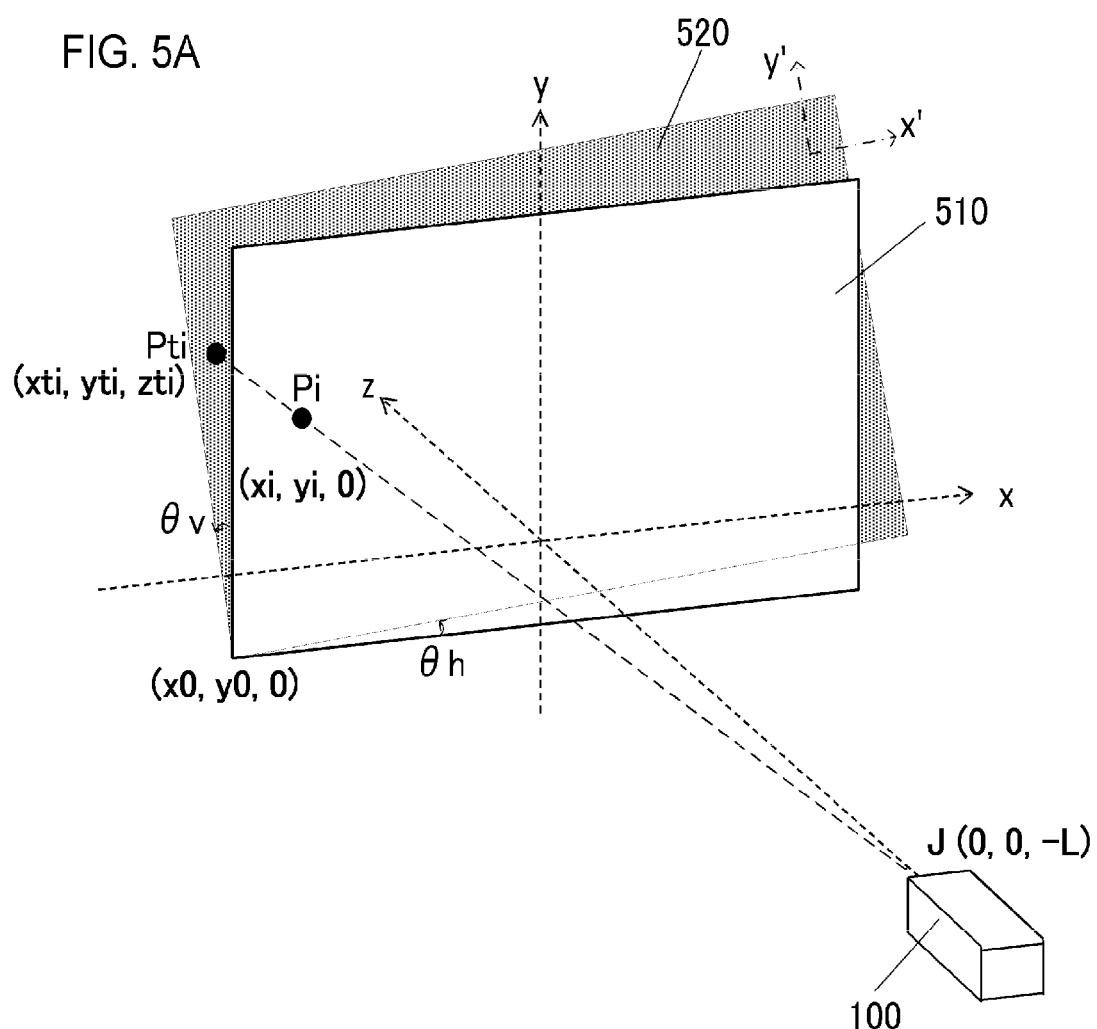
FIGS. 5A and 5B are diagrams for explaining a positional relation between the display apparatus 100 and a screen in the first embodiment.

FIG. 5A is a diagram for explaining a positional relation between the display apparatus 100 and the screen 520.

In the first embodiment, an imaginary screen 510 right opposed to the display apparatus 100 and orthogonal to an optical axis direction of the projection optical system 171 is installed. An optical-axis center coordinate system with the horizontal direction set as a x axis, the vertical direction set as a y axis, and the optical axis direction set as a z axis is set on the imaginary screen 510 (an imaginary surface). The display apparatus 100 projects an image on the screen 520 tilting by an angle θh around an axis parallel to the y axis and tilting by an angle θv around an axis parallel to the x axis with respect to the imaginary screen 510 with any point (x0, y0, 0) on an xy plane set as a fixed point.

Actually, the screen 520 is installed such that the projection surface of the screen 520 is parallel to the vertical direction. The display apparatus 100 is installed such that the direction of projected light from the display apparatus 100 is obliquely upward. However, in FIG. 5A, for convenience of explanation, a projection surface of the imaginary screen 510 is set parallel to the vertical direction and the screen 520 is tilted with respect to the vertical direction.

Figure 5B:
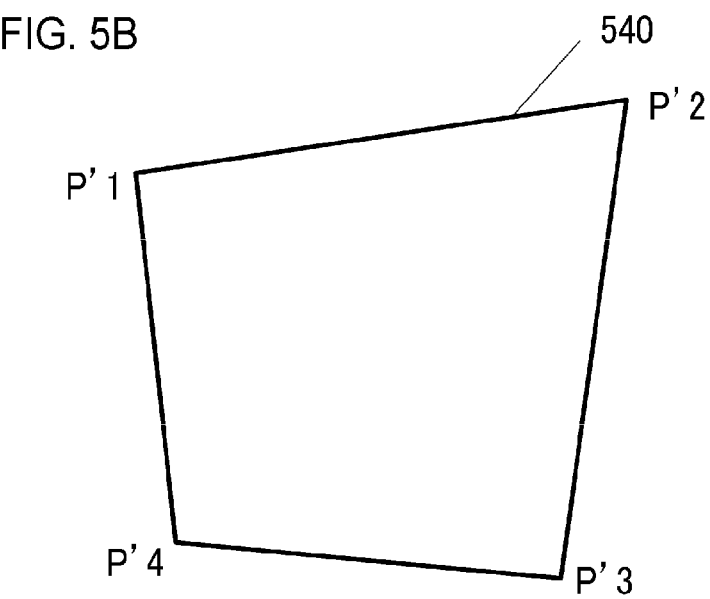

When the imaginary screen 510 is right opposed to the display apparatus 100, an image projected on the imaginary screen 510 has a rectangular shape on the basis of an original image signal. On the other hand, as shown in FIG. 5B, the projection region before deformation 540 projected on the screen 520 has a distorted square shape widened in an upper part and a right part.

A method of calculating the projection region before deformation 540 projected on the screen 520 is explained.

When the projection surface (a plane) of the screen 520 is represented as an optical-axis center coordinate system, the projection surface can be represented by Expression 3.

$$z = (x - x0)\tan\theta h + (y - y0)\tan\theta v \quad \text{Expression 3}$$

A point Pi (xi, yi, 0) projected on the imaginary screen 510 right opposed to the display apparatus 100 is projected on a point Pti(xti, yti, zti) on the screen 520. A coordinate of the point Pti is a coordinate of an intersection of a straight line connecting a light source J and the point Pi and the projection surface of the screen 520.

When the distance from the display apparatus 100 to the imaginary screen 510 is represented as L, a coordinate of the light source J is (0, 0, −L). An expression of the straight line J-Pi can be represented by Expression 4.

$$y = (yi/xi) \times x \quad z = (L/xi) \times x - L \quad \text{Expression 4}$$

The coordinate of the point Pti can be represented by Expression 5.

$xti=(K0/Ki) \times xiyti=(K0/Ki) \times yizti=(K0/Ki-1) \times L$   Expression 5 in the expression, $Ki=L-xi \times \tan\theta h - yi \times \tan\theta v$

The coordinate of the point Pti calculated by Expression 5 is a coordinate based on the projection surface of the imaginary screen 510. Therefore, it is necessary to perform coordinate transformation for transforming the coordinate of the point Pti calculated by Expression 5 into an x'y' coordinate based on the projection surface of the screen 520. A transformation matrix Ms for performing coordinate transformation from an xyz coordinate system into an x'y'z' coordinate system can be represented by Expression 6 using the angles θv and θh.

[Math. 3]

$$Ms = \begin{bmatrix} \cos\theta z & -\sin\theta z & 0 \\ \sin\theta z & \cos\theta z & 0 \\ 0 & 0 & 1 \end{bmatrix} \begin{bmatrix} 1 & 0 & 0 \\ 0 & \cos\theta v' & \sin\theta v' \\ 0 & -\sin\theta v' & \cos\theta v' \end{bmatrix}$$ Expression 6

$$\begin{bmatrix} \cos\theta h & 0 & \sin\theta h \\ 0 & 1 & 0 \\ -\sin\theta h & 0 & \cos\theta h \end{bmatrix}$$

in the expression, $\theta v'=\tan^{-1}(\tan\theta v \times \cos\theta h)$ $\theta z=\tan^{-1}(\cos\theta h \times \tan\theta h \times \sqrt{2(1-\cos\theta v)})$ (when $\theta v \geq 0$)

$\theta z=-\tan^{-1}(\cos\theta h \times \tan\theta h \times \sqrt{2(1-\cos\theta V)})$ (when $\theta v < 0$)

Consequently, coordinates of four vertexes of the projection region before deformation 540 projected on the screen 520 can be calculated in the x'y' coordinate system.

The four vertexes are shown in FIG. 5B as points P'1 to P'4.

Subsequently, the CPU 110 determines a projection region after deformation 720 (see FIG. 7D) on the screen 520 (S403).

In the first embodiment, the projection region after deformation 720 is a rectangular region disposed in the projection region before deformation 540 and having a desired aspect ratio on the screen 520. The projection region after deformation 720 is disposed in the projection region before deformation 540 in order to improve convenience in installation of the display apparatus 100. This point is explained below. The user installs the display apparatus 100 such that the projection region before deformation 540 fits within the screen 520. At this point, if the CPU 110 calculates the projection region after deformation 720 such that the projection region after deformation 720 fits within the projection region before deformation 540, the projection region after deformation 720 can also be fit within the screen 520. Therefore, the user can perform installation work of the display apparatus 100 without worrying whether the projection region after deformation 720 fits within the screen 520. Therefore, by disposing the projection region after deformation 720 within the projection region before deformation 540, it is possible to improve convenience in installing the display apparatus 100. Note that, if the projection region after deformation 720 fits within the screen 520, a part of the projection region after deformation 720 may be disposed not to fit within the projection region before deformation 540.

A detailed flowchart of this processing is shown in FIG. 6.

First, the CPU 110 calculates a coordinate of an intersection of the diagonal lines of the projection region before deformation 540 (S601).

FIG. 7A is a diagram showing the projection region before deformation 540 in the x'y' coordinate system on the screen 520. The CPU 110 calculates the coordinate of the intersection of the diagonal lines in the projection region before deformation 540 from coordinates of the four vertexes (four corners) P'1 to P'4 of the projection region before deformation 540 on the screen 520 calculated in step S402. The coordinate is set as a reference point 710 of deformation.

Subsequently, the CPU 110 calculates coordinates of intersections of the diagonal lines of the projection region after deformation 720 and the outer periphery (the outline) of the projection region before deformation 540 (S602). As shown in FIG. 7B, the CPU 110 calculates expressions of two straight lines passing through the reference point 710 and having slopes that are identical to the slopes of the diagonal lines of a rectangle having a desired aspect ratio, and calculates coordinates of points Q1 to Q4 where the straight lines cross the outer periphery of the projection region before deformation 540. In FIG. 7B, a setting value of the desired aspect ratio is represented as a:b. Two straight lines respectively having slopes (b/a) and (−b/a) are drawn.

Subsequently, the CPU 110 determines the size of the projection region after deformation 720 (S603). In the first embodiment, the projection region after deformation 720 is disposed in the projection region before deformation 540. Therefore, first, as shown in FIG. 7C, the distances between the reference point 710 and the points Q1 to Q4 are represented as d1 to d4. A smallest one of the distances is calculated. In FIG. 7C, since d4 is the smallest, the projection region after deformation 720 is a rectangle, the lengths of the diagonal lines of which are twice as large as d4.

Subsequently, the CPU 110 calculates coordinates of the four vertexes of the projection region after deformation 720 (S604). As shown in FIG. 7D, the CPU 110 calculates coordinates of four points R1 to R4 present at the distance d4 from the reference point 710 on the two straight lines drawn in step S602. At least one point (R4 in the figure) among the points R1 to R4 coincides with any one of the points Q1 to Q4 corresponding to the point (Q4 corresponding to R4).

Consequently, coordinates of the four vertexes (R1 to R4) of the projection region after deformation 720 in the x'y' coordinate system on the screen 520 are calculated. The projection region after deformation 720 calculated in this way is disposed within the projection region before deformation 540 in a state in which the intersection of the diagonal lines coincides with the intersection of the diagonal lines of the projection region before deformation 540. The projection region after deformation 720 is a largest region in the projection region before deformation 540. In the first embodiment, the projection region after deformation 720 is the largest region in the projection region before deformation 540. However, the present invention is not limited to this. The size of the projection region after deformation 720 is not limited as long as the projection region after deformation 720 is within the projection region before deformation 540.

Referring back to the flowchart of FIG. 4, the CPU 110 calculates coordinates of four vertexes of a display image after deformation on each of the liquid crystal panels 151R, 151G, and 151B (S404). A transformation matrix from an x'y'z' coordinate of the screen 520 surface reference into an xyz coordinate of the imaginary screen 510 surface reference is an inverse matrix of Ms represented by Expression 6.

The inverse matrix of the transformation matrix Ms of Expression 6 is multiplied with the coordinates of the vertexes of the projection region after deformation 720 calculated in S604, whereby coordinates corresponding to the vertexes of the projection region after deformation 720 in the coordinate system on the imaginary screen 510 are obtained. The shape of an image projected on the imaginary screen 510 and the shape of a display image displayed on each of the liquid crystal panels 151R, 151G, and 151B are similar.

Therefore, coordinates corresponding to the vertexes of the projection region after deformation 720 in a display image after deformation on each of the liquid crystal panels 151R, 151G, and 151B are calculated by offsetting the origin with respect to the coordinates calculated in the coordinate system on the imaginary screen 510.

A shape 730 of the display image before deformation and a shape 740 of the display image after deformation on each of the liquid crystal panels 151R, 151G, and 151B are shown in FIG. 7E. The keystone correction is also processing for geometrically deforming (projection-transforming) an image corresponding to the shape 730 of the display image before deformation on each of the liquid crystal panels 151R, 151G, and 151B to match the image with the shape 740 of the display image after deformation.

Subsequently, the CPU 110 calculates deformation parameters in the coordinate system on the liquid crystal panels (S405). Assuming that the coordinates of the four vertexes before deformation are an original image and the coordinates of the four vertexes after deformation obtained in S404 are an image after deformation, the CPU 110 calculates the projection transformation matrix M and the offset (xso, yso), (xdo, ydo) of Expression 1.

Finally, the CPU 110 sets the deformation parameters calculated in S405 in the image processing section 140 (S406).

An example of an image formed when the keystone correction is carried out by applying the first embodiment is shown in FIGS. 8A to 8D. FIG. 8A is a diagram for explaining a state in which the screen is disposed right opposed to the display apparatus 100 (equivalent to the imaginary screen 510 shown in FIG. 5A). FIGS. 8B to 8D are diagrams for explaining a state in which the screen is disposed to tilt from a position right opposed to the display apparatus 100. A state of the screen shown in FIG. 8B is equivalent to a state in which the imaginary screen 510 shown in FIG. 5A tilts around an axis parallel to the y axis. A state of the screen shown in FIG. 8C is equivalent to a state in which the imaginary screen 510 shown in FIG. 5A tilts around an axis parallel to the x axis. A state of the screen shown in FIG. 8D is equivalent to a state in which the imaginary screen 510 shown in FIG. 5A tilts around the axis parallel to the x axis and tilts around the axis parallel to the y axis. In FIGS. 8A to 8D, figures on the left side show the projection region before deformation 540 on the screen and figures in the center show the projection region after deformation 720 disposed in the projection region before deformation 540 on the screen. In FIGS. 8A to 8D, figures on the right side show the shape 730 of the display image before deformation and the shape 740 of the display image after deformation on the liquid crystal panels.

In FIGS. 8A to 8D, hatching regions in the figures in the center are regions where the image is not projected after the keystone correction in the projection region before deformation 540. Strictly, black is projected on the regions. As indicated by broken lines in FIGS. 8A to 8D, the position of an intersection of the diagonal line of the image (the center of the image) on the screen does not change before and after the deformation. In FIGS. 8A to 8D, only the horizontal direction is shown. However, the position of the intersection of the diagonal lines on the screen before and after the deformation does not change in the vertical direction either.

The same applies to the liquid crystal panels in the figures on the right side in FIGS. 8A to 8D. The position of the intersection of the diagonal lines of the display image does not change before and after the deformation. This is because, if a relative positional relation between the display apparatus 100 and the screen and optical system parameters are the same, an image displayed in a certain pixel on the liquid crystal panels is always projected on the same position on the screen.

As explained above, in the first embodiment, the keystone correction for matching the intersection of the diagonal lines of the projection region before deformation 540 and the intersection of the diagonal lines of the projection region after deformation 720 is performed. Consequently, in the installation of the display apparatus 100, the user can clearly recognize the intersection of the diagonal lines of the projection region before deformation 540 and the intersection of the diagonal lines of the projection region after deformation 720 as a reference position of the keystone correction.

Consequently, the user can dispose the projection region after deformation 720 in a position expected by the user on the screen. Therefore, it is possible to reduce rework in the installation of the display apparatus 100. It is possible to improve convenience in the installation of the display apparatus 100.

In the installation of the display apparatus 100, the user desirably projects, on the screen, an image in which the intersection of the diagonal lines (the image center) is clear as shown in FIG. 8A and installs the display apparatus 100 in a position where the intersection of the diagonal lines (the image center) coincides with the screen center. Consequently, even after the keystone correction is carried out, it is possible to keep the center of the projection region after deformation and the screen center coinciding with each other.

It is desirable to prepare, as a test pattern incorporated in the display apparatus 100, the image in which the intersection of the diagonal lines (the image center) is clear as shown in FIG. 8A and an image for indicating a position at an intersection of the diagonal lines of a projected image at the time when the image is projected on the screen. Further, when a test image for indicating the position of the intersection of the diagonal lines is displayed, it is desirable to perform display for urging the user to align the test image with the center of the screen.

Consequently, in the installation of the display apparatus 100, the user does not need to prepare an input image. It is possible to further improve the convenience. Since it is possible to perform the keystone correction while keeping the intersection of the diagonal lines of the projected image and the center of the screen coinciding with each other, it is possible to reduce installation work of the display apparatus, which is complicated because the centers deviate, for moving the display apparatus with respect to the screen after the keystone correction.

Note that, in S403 in FIG. 4, the projection region after deformation 720 on the screen 520 is determined according to the processing in S601 to S604 shown in FIG. 6. However, the present invention is not limited to this. The projection region after deformation 720 on the screen 520 may be determined by calculating coordinates of four vertexes of a rectangle having an aspect ratio set in advance, the position of an intersection of the diagonal lines of which is the reference point 710 calculated by processing same as S601. At this point, the size (the length of the diagonal lines) of the projection region after the deformation 720 may be set as appropriate. However, the size is desirably set the same as or smaller than the size of the projection surface of the screen 520. As explained above, in the installation of the display apparatus 100, the user desirably projects an image, the image center of which is clear, on the screen 520 and installs the display apparatus 100 in a position where the image center coincides with the screen center.

Consequently, even after the keystone correction is carried out, it is possible to keep the center of the projection region after deformation and the screen center coinciding with each other. It is possible to project an image having a desired size on the screen 520.

Second Embodiment

A second embodiment is explained. In the second embodiment, concerning portions same as the portions in the first embodiment, explanation of the portions is omitted. Portions different from the portions in the first embodiment are explained.

In the first embodiment, the keystone correction is performed using the projection region on the screen on which the image displayed on the liquid crystal panels is projected. On the other hand, in the second embodiment, the keystone correction is performed using a projection region on a screen on which an image in an effective image region, which is a part of an image display region on the liquid crystal panels, is projected.

In the second embodiment, when an aspect ratio of the screen 520 and an aspect ratio of the liquid crystal panels 151R, 151G, and 151B of the image display apparatus 100 are different, a region having an aspect ratio identical to the aspect ratio of the screen 520 is defined on the liquid crystal panels as the effective image region. It is possible to display an image in the effective image region.

As a standard, the effective image region is disposed in the center of the liquid crystal panels. However, the user can change the disposition of the effective image region using the operation section 113 or the remote controller. The display position on the screen 520 can also be changed according to an installation position of the display apparatus 100 or a lens shift. However, since the disposition of the effective image region on the liquid crystal panels can be moved in a unit of one pixel, it is possible to more accurately adjust the disposition of the effective image region.

The internal configuration of the image processing section 140 in the second embodiment is the same as the internal configuration shown in FIG. 3. The image processing section 140 in the second embodiment is different from the image processing section 140 in the first embodiment in that the first processing section 310 shown in FIG. 3 carries out layout processing for disposing the effective image region in a desired region on each of the liquid crystal panels 151R, 151G, and 151B. In the second embodiment, the post-image processing signal sig303 includes the effective image region and an ineffective image region.

The second processing section 320 receives the post-image processing signal sig303 as an input signal and applies image deformation processing. Therefore, the ineffective image region is also deformed.

FIGS. 9A to 9D are diagrams showing an example of an image formed when an aspect ratio of the screen is set to 4:3 and the keystone correction is carried out by applying the second embodiment. FIG. 9A is a diagram for explaining a state in which the screen is disposed right opposed to the display apparatus 100. FIGS. 9B to 9D are diagrams for explaining a state in which the screen is disposed to tilt from a position right opposed to the display apparatus 100. A state of the screen shown in FIG. 9B is equivalent to a state in which the imaginary screen 510 shown in FIG. 5A tilts around an axis parallel to the y axis. A state of the screen shown in FIG. 9C is equivalent to a state in which the imaginary screen 510 shown in FIG. 5A tilts around an axis parallel to the x axis. A state of the screen shown in FIG. 9D is equivalent to a state in which the imaginary screen 510 shown in FIG. 5A tilts around the axis parallel to the x axis and tilts around the axis parallel to the y axis.

In FIGS. 9A to 9D, figures on the left side show a projection region before deformation 910 on the screen and figures in the center show a projection region after deformation 920 disposed in the projection region before deformation 910 on the screen. In FIGS. 9A to 9D, figures on the right side show an effective image region before deformation 930 and an effective image region after deformation 940 on the liquid crystal panels.

FIGS. 9A to 9D each show an example in which the effective image region before deformation 930 is disposed on the left side on the liquid crystal panel. A portion of hatching is the ineffective image region. Black is displayed in the ineffective image region. An ineffective image region before deformation 950 is also projection-transformed and deformed according to deformation parameters of the effective image region to be an ineffective image region after deformation 960.

As explained above, according to the second embodiment, even when an aspect ratio of the screen 520 and an aspect ratio of the liquid crystal panels 151R, 151G, and 151B of the display apparatus 100 are different, it is possible to obtain effects same as the effects in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-170655, filed on Aug. 31, 2015, which is hereby incorporated by reference herein in its entirety.

What is claimed is:

1. A display apparatus including a projection optical system that projects an image on a projection surface, the display apparatus comprising:
a deforming unit configured to geometrically deform an input image in order to correct a distortion in a projected image obtained when the input image is projected on the projection surface; and
a setting unit configured to set parameters of image deformation processing by the deforming unit, wherein
the setting unit sets the parameters such that a position of an intersection of diagonal lines of a first projected image obtained when the image before being deformed according to the set parameters is projected on the projection surface is identical to a position of an intersection of diagonal lines of a second projected image obtained when a deformed image, which is an image after being deformed according to the set parameters, is projected on the projection surface.

2. The display apparatus according to claim 1, wherein the setting unit sets the parameters such that the second projected image is located within a region of the first projected image.

3. The display apparatus according to claim 2, wherein the setting unit sets the parameters such that the second projected image is a largest image within the region of the first projected image.

4. The display apparatus according to claim 1, further comprising an acquiring unit configured to acquire information concerning a positional relation between the projection optical system and the projection surface, wherein
the setting unit sets the parameters on the basis of the information acquired by the acquiring unit.

5. The display apparatus according to claim 4, further comprising a coordinate transforming unit configured to perform coordinate transformation between a first coordinate system, which is a coordinate system on an imaginary surface orthogonal to an optical axis direction of the projection optical system, and a second coordinate system, which is a coordinate system on the projection surface, on the basis of the information acquired by the acquiring unit, wherein
the setting unit sets the parameters by calculating a coordinate in the second coordinate system of a vertex of the first projected image using the coordinate transforming unit, by calculating a coordinate in the second coordinate system of the intersection of the diagonal lines of the first projected image from the coordinate in the second coordinate system of the vertex of the first projected image, by calculating coordinates in the second coordinate system of four vertexes of a rectangle having the position of the intersection as a position of an intersection of diagonal lines thereof and having an aspect ratio set in advance, and by calculating, using the coordinates in the second coordinate system of the four vertexes and the coordinate transforming unit, a coordinate in the first coordinate of a vertex of an image obtained when the deformed image is projected on the imaginary surface.

6. The display apparatus according to claim 4, further comprising a coordinate transforming unit configured to perform coordinate transformation between a first coordinate system, which is a coordinate system on an imaginary surface orthogonal to an optical axis direction of the projection optical system, and a second coordinate system, which is a coordinate system on the projection surface, on the basis of the information acquired by the acquiring unit, wherein
the setting unit sets the parameters by calculating a coordinate in the second coordinate system of a vertex of the first projected image, by calculating a coordinate in the second coordinate system of the intersection of the diagonal lines of the first projected image from the coordinate in the second coordinate system of the vertex of the first projected image, calculating, when a setting value of an aspect ratio of the second projected image is (a:b), coordinates in the second coordinate system of four points where two straight lines respectively having slopes of (b/a) and (−b/a) and passing through the intersection cross an outline of the first projected image, by calculating coordinates in the second coordinate system of four points on the two straight lines separated from the intersection by a shortest distance among distances between the four points and the intersection, and by calculating, using the coordinates in the second coordinate system of the four points on the two straight lines and the coordinate transforming unit, a coordinate in the first coordinate of a vertex of an image obtained when the deformed image is projected on the imaginary surface.

7. The display apparatus according to claim 1, wherein, when an aspect ratio of the image and an aspect ratio of the projection surface are different, a region of the image having an aspect ratio identical to the aspect ratio of the projection surface is projected by the projection optical system.

8. The display apparatus according to claim 1, wherein information concerning a positional relation between the projection optical system and the projection surface includes an inclination angle of the display apparatus, a zoom value of a zoom lens included in the projection optical system, or a lens shift amount of a shift lens included in the projection optical system.

9. The display apparatus according to claim 1, wherein the display apparatus displays a test image for indicating a position of an intersection of diagonal lines of a projected image obtained when an image is projected on the projection surface, and performs display for urging a user to align the test image with a center of the projection surface.

10. A control method for a display apparatus including a projection optical system that projects an image on a projection surface, the control method comprising:
geometrically deforming an input image in order to correct a distortion in a projected image obtained when the input image is projected on the projection surface; and
setting parameters of image deformation processing in the deforming, wherein
in the setting, the parameters are set such that a position of an intersection of diagonal lines of a first projected image obtained when the image before being deformed according to the set parameters is projected on the projection surface is identical to a position of an intersection of diagonal lines of a second projected image obtained when a deformed image, which is an image after being deformed according to the set parameters, is projected on the projection surface.

11. A non-transitory computer readable storage medium storing a program for causing a computer to execute a control method for a display apparatus including a projection optical system that projects an image on a projection surface, the control method including:
  geometrically deforming an input image in order to correct a distortion in a projected image obtained when the input image is projected on the projection surface; and
  setting parameters of image deformation processing in the deforming, wherein
  in the setting, the parameters are set such that a position of an intersection of diagonal lines of a first projected image obtained when the image before being deformed according to the set parameters is projected on the projection surface is identical to a position of an intersection of diagonal lines of a second projected image obtained when a deformed image, which is an image after being deformed according to the set parameters, is projected on the projection surface.

* * * * *